(12) United States Patent
Atzert et al.

(10) Patent No.: US 9,731,811 B2
(45) Date of Patent: Aug. 15, 2017

(54) PAYLOAD SHROUD FOR AIR VEHICLE

(71) Applicant: AAI Corporation, Hunt Valley, MD (US)

(72) Inventors: Monica Atzert, Shrewsbury, PA (US); Jason Wallace, Cockeysville, MD (US); Robert Hurn, Baltimore, MD (US); Doug Deardorff, Phoenix, MD (US); Terry Zeleny, Nottingham, MD (US)

(73) Assignee: AAI Corporation, Hunt Valley, MD (US)

( * ) Notice: Subject to any disclaimer, the term of this patent is extended or adjusted under 35 U.S.C. 154(b) by 491 days.

(21) Appl. No.: 14/105,988

(22) Filed: Dec. 13, 2013

(65) Prior Publication Data

US 2016/0009371 A1    Jan. 14, 2016

(51) Int. Cl.
| | |
|---|---|
| *B64C 1/22* | (2006.01) |
| *B64C 7/00* | (2006.01) |
| *B64C 1/36* | (2006.01) |
| *B64D 1/08* | (2006.01) |
| *B64C 39/02* | (2006.01) |
| *B64D 47/08* | (2006.01) |

(52) U.S. Cl.
CPC ............... *B64C 7/00* (2013.01); *B64C 1/36* (2013.01); *B64C 39/024* (2013.01); *B64D 1/08* (2013.01); *B64D 47/08* (2013.01); *B64C 2201/021* (2013.01); *B64C 2201/123* (2013.01); *B64C 2201/128* (2013.01)

(58) Field of Classification Search
None
See application file for complete search history.

(56) References Cited

U.S. PATENT DOCUMENTS

| | | | | |
|---|---|---|---|---|
| 2,557,962 | A * | 6/1951 | Greene | B64C 39/02 244/118.2 |
| 5,303,879 | A * | 4/1994 | Bucher | B64C 29/0025 244/12.2 |
| 5,318,248 | A * | 6/1994 | Zielonka | B64C 39/001 244/12.2 |
| 5,372,337 | A * | 12/1994 | Kress | B64C 15/12 244/12.3 |
| 5,407,150 | A * | 4/1995 | Sadleir | B64C 29/0025 244/12.4 |

(Continued)

OTHER PUBLICATIONS

International Search Report and Written Opinion for PCT International Application No. PCT/US14/59647, dated Jan. 7, 2016.

*Primary Examiner* — Medhat Badawi
(74) *Attorney, Agent, or Firm* — Venable LLP; Jeffri A. Kaminski

(57) ABSTRACT

A UAV includes a body. The body defines a payload opening 14. The payload opening is circular, but any shape may be used. A payload of the UAV is arranged in the payload opening. The payload may be a camera, sensors, a package, etc. A payload shroud may be installed which prohibits or reduced ingress of foreign material via payload opening. A payload shroud may include a diverter. The diverter may act as a barrier wall preventing the water or debris from entering the body of the UAV. The diverter should fit flush with the payload opening in the body of the UAV.

23 Claims, 4 Drawing Sheets

(56) References Cited

U.S. PATENT DOCUMENTS

| | | | | |
|---|---|---|---|---|
| 5,419,513 A | * | 5/1995 | Flemming, Jr. | B64C 27/20 244/12.2 |
| 5,421,538 A | * | 6/1995 | Vassa (Suratano Thienphropa) | B64C 27/20 244/100 R |
| 5,507,453 A | * | 4/1996 | Shapery | B64C 29/0025 244/12.2 |
| 5,779,190 A | * | 7/1998 | Rambo | B64C 39/024 244/118.2 |
| 6,056,237 A | * | 5/2000 | Woodland | B64C 3/40 244/120 |
| 6,164,595 A | * | 12/2000 | Williams | B64D 25/08 244/139 |
| 6,392,213 B1 | * | 5/2002 | Martorana | B64C 39/024 244/13 |
| 6,457,670 B1 | * | 10/2002 | Geranio | B64C 29/0025 244/17.23 |
| 6,607,162 B2 | * | 8/2003 | Warsop | B64C 39/062 244/12.6 |
| 6,848,649 B2 | * | 2/2005 | Churchman | B64C 29/0025 244/12.6 |
| 6,883,748 B2 | * | 4/2005 | Yoeli | B60V 1/06 244/118.1 |
| 7,032,859 B2 | * | 4/2006 | Mohr | B64C 11/001 244/12.2 |
| 7,032,861 B2 | * | 4/2006 | Sanders, Jr. | B64C 27/12 244/12.1 |
| 7,090,178 B2 | * | 8/2006 | Hughes | F16J 15/43 248/177.1 |
| 7,237,750 B2 | * | 7/2007 | Chiu | B64C 1/00 244/119 |
| 7,607,607 B2 | * | 10/2009 | Darrow, Jr. | B64C 7/00 114/243 |
| 7,922,115 B2 | * | 4/2011 | Colgren | B64C 9/02 244/120 |
| 8,559,801 B2 | * | 10/2013 | Dimotakis | B64D 47/08 396/12 |
| 2003/0062442 A1 | * | 4/2003 | Milde, Jr. | B64C 3/56 244/12.3 |
| 2003/0192986 A1 | * | 10/2003 | Page | B64C 1/0009 244/36 |
| 2004/0232279 A1 | * | 11/2004 | Melkuti | B64C 29/0025 244/12.1 |
| 2005/0127239 A1 | * | 6/2005 | Srivastava | B64C 27/20 244/12.2 |
| 2006/0169840 A1 | * | 8/2006 | French | B64C 1/1469 244/118.5 |
| 2006/0249627 A1 | * | 11/2006 | Martin Hernandez | B64C 7/00 244/130 |
| 2007/0057113 A1 | * | 3/2007 | Parks | B64C 15/00 244/12.5 |
| 2007/0119042 A1 | * | 5/2007 | Thermos | F16J 15/3296 29/464 |
| 2010/0044496 A1 | * | 2/2010 | Gosling | B64C 39/024 244/12.5 |
| 2010/0123042 A1 | | 5/2010 | Ballard et al. | |
| 2010/0140389 A1 | * | 6/2010 | Gleed | B64C 3/38 244/12.6 |
| 2010/0224721 A1 | | 9/2010 | Wood et al. | |
| 2011/0163199 A1 | * | 7/2011 | Cardozo | B64C 27/82 244/17.13 |
| 2012/0303179 A1 | * | 11/2012 | Schempf | B25J 11/002 701/2 |
| 2013/0256992 A1 | * | 10/2013 | Zheng | F16J 15/3288 277/355 |
| 2014/0091172 A1 | * | 4/2014 | Arlton | B64C 27/14 244/17.23 |
| 2014/0317994 A1 | * | 10/2014 | Bodo | A01M 29/34 43/108 |
| 2015/0063990 A1 | * | 3/2015 | Naert | F01D 11/001 415/173.3 |
| 2015/0300191 A1 | * | 10/2015 | Morreale | F01D 11/001 415/174.2 |

* cited by examiner

PAYLOAD SHROUD FOR AIR VEHICLE

CROSS-REFERENCE TO RELATED APPLICATIONS

This invention was made using U.S. Government support under Grant No. contracts W58RGZ-11-C-0103 and W58RGZ-12-C-0071. The U.S. Government has certain rights in this invention.

BACKGROUND

Embodiments of the present invention relate generally to new and useful improvements in air vehicles, and more particularly to weatherization of unmanned aerial vehicles.

Unmanned air vehicles (UAV) are seeing an increasing variety of uses including surveillance and package delivery in military and law enforcement situations. UAVs may include an opening via which a payload, such as cameras, sensors and the like, may be mounted. The payload may extend from the opening, exposing the payload to the elements. Accordingly, water, snow, debris, etc. may enter the interior of the UAV via the payload opening and adversely impact the UAV's avionics. The payload may need to rotate, so sealing the payload opening with a gasket or the like is not practical. A prior solution was to enclose the payload in a glass ball. However, the glass ball enclosure interferes with the payload, for example by interfering with the payload sensors and introducing optical distortion. Additionally, the glass ball makes it difficult to access the payload for repair or to install a different payload. There is a need, particularly in military applications, for a more robust UAV that can fly operations in snow, icing, fog and rain.

In short, there exists a need in the art for improved weatherization for UAVs.

SUMMARY

According to an embodiment, a payload shroud, comprises a diverter including a cylindrical wall defining a hollow central portion; a seal; and a flexible membrane on at least a portion of the diverter.

According to another embodiment, a body for an air vehicle, including a payload receiving portion is provided. The payload receiving portion is adapted to receive a payload via an opening therein, a diverter disposed within the opening, the diverter including a cylindrical wall defining a central portion, the cylindrical wall having a top and a bottom and a seal disposed at the top and/or bottom of the cylindrical wall.

According to another embodiment an air vehicle, comprises body defining a payload opening therein; a payload suspended in the payload opening; a payload shroud arranged within the body and around the payload, the payload shroud including, a diverter attached to the body above the opening, the diverter including a cylindrical wall defining a central portion, the cylindrical wall having a top and a bottom, and a seal disposed at the top of the cylindrical wall.

This summary is provided merely to introduce certain concepts and not to identify any key or essential features of the claimed subject matter. Further features and advantages of embodiments of the invention, as well as the structure and operation of various embodiments of the invention, are described in detail below with reference to the accompanying drawings.

BRIEF DESCRIPTION OF THE DRAWINGS

The foregoing and other features and advantages of embodiments of the invention will be apparent from the following, more particular description of embodiments of the invention, as illustrated in the accompanying drawings wherein like reference numbers generally indicate identical, functionally similar, and/or structurally similar elements. Unless otherwise indicated, the accompanying drawing figures are not to scale.

DETAILED DESCRIPTION

Various embodiments of the invention are discussed herein. While specific embodiments are discussed, specific terminology is employed for the sake of clarity. However, the invention is not intended to be limited to the specific terminology so selected and it should be understood that this is done for illustration purposes only. A person skilled in the relevant art will recognize that other components and configurations can be used without parting from the spirit and scope of the invention. Each specific element includes all technical equivalents that operate in a similar manner to accomplish a similar purpose.

Figure 1:
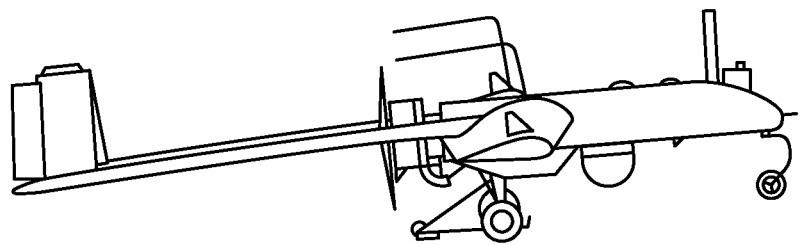
FIG. 1 depicts an air vehicle according to an embodiment of the present invention.
Figure 2:
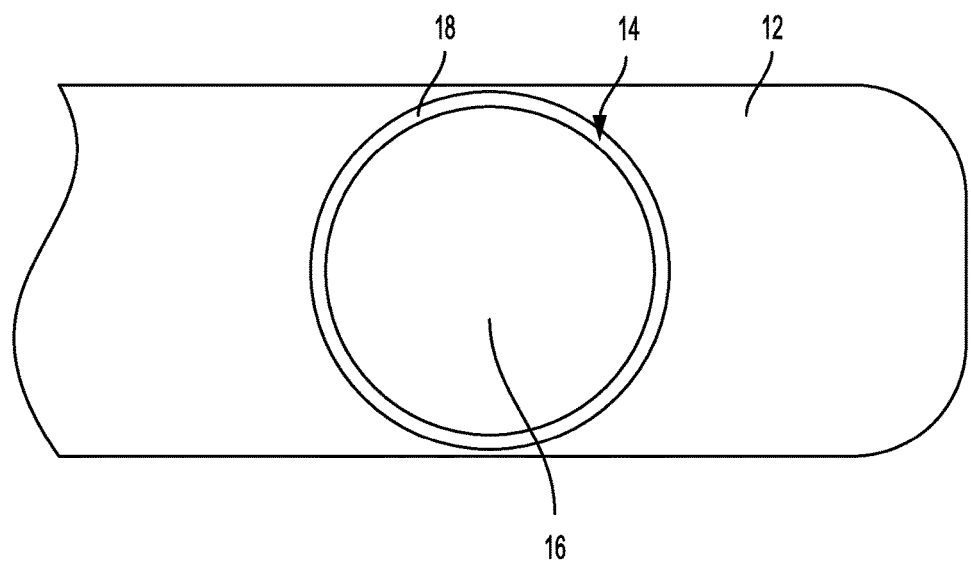
FIG. 2 depicts a bottom view of the air vehicle of FIG. 1.
Figure 4:
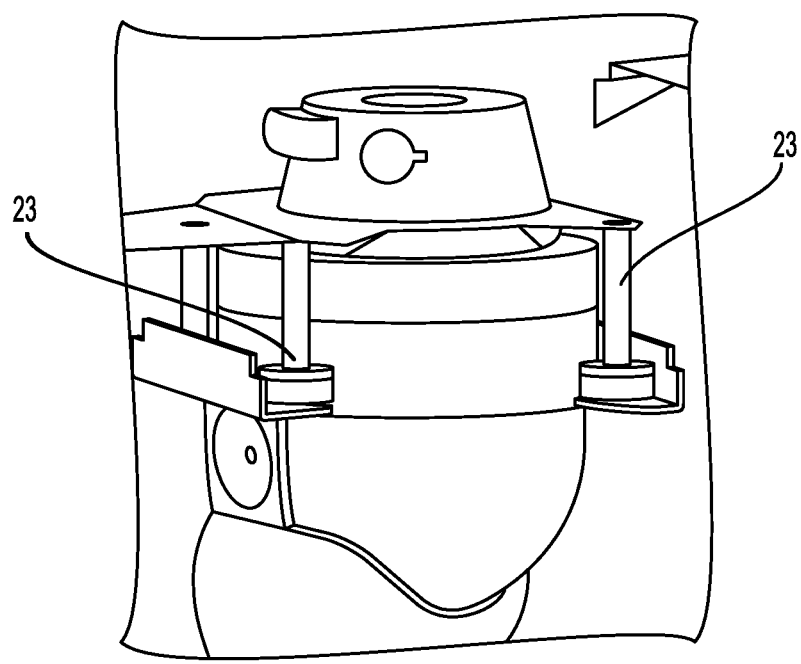
FIG. 4 depicts a payload shroud and payload mounted in an air vehicle according to an embodiment of the present invention.

Referring to the drawings, there is shown in FIGS. 1 and 2 an example of an air vehicle, in this case a UAV 10. The UAV 10 includes a body 12. The body 12 defines a payload opening 14. The payload opening 14 is circular, but any shape may be used. A payload 16 of the UAV 10 is arranged in the payload opening 14. The payload 16 may be a camera, sensors, a package, etc. The various payloads 16 can be removably attached in the payload opening 14 via a mounting apparatus (FIG. 4). Typically, the payload 16 extends from the opening outside the body 12 of the UAV 10 as is shown in FIG. 1. Accordingly, the payload 16 is exposed to the elements. In many cases it is required that the payload 16 rotate within the opening and the body 12 of the UAV 10. For example, it may be required that a payload 16 of cameras or sensors is able to rotate or move to focus on a particular target. Thus, a gap 18 may be present between the payload 16 and the body 12 of the UAV 10. Water, snow, etc., may enter the UAV 10 via the gap 18 and adversely impact the UAV's 10 avionics. In an embodiment of the invention a shroud may be provided to minimize intrusion of water, snow, debris, etc. into the body 12.

Figure 3:
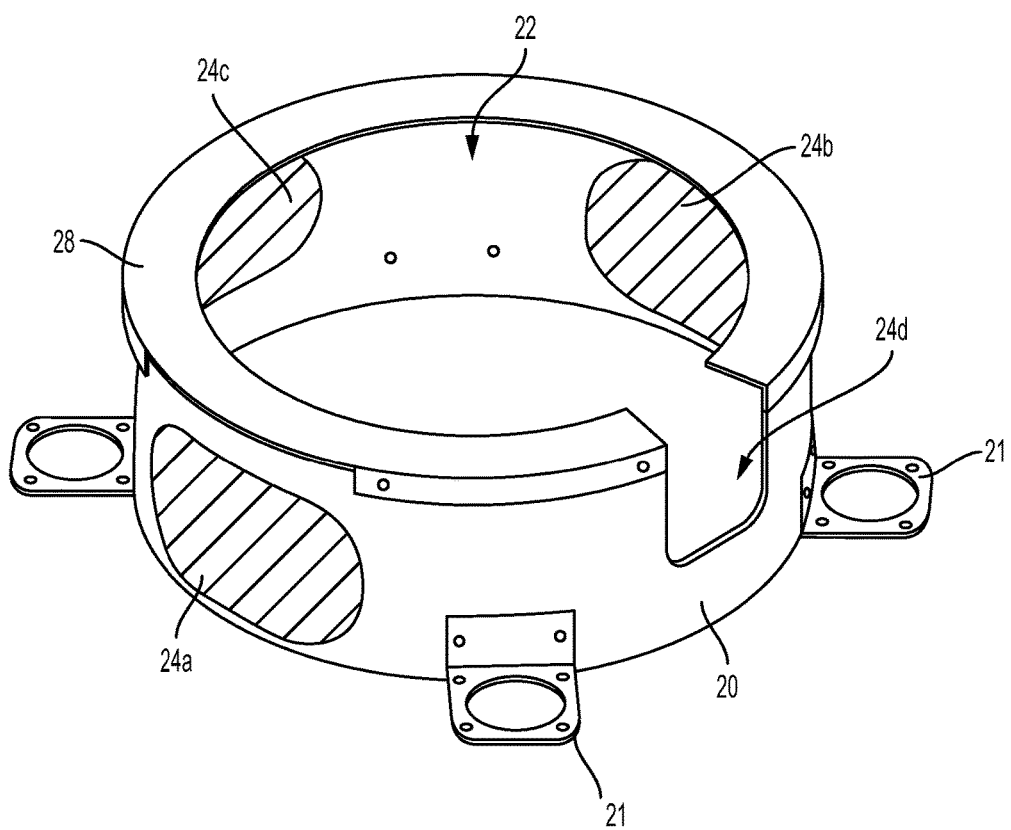
FIG. 3 depicts payload shroud according to an embodiment of the present invention.

The payload shroud may be arranged within and/or above the payload opening 14 in the body 12 of the UAV 10. FIG. 3 illustrates a more detailed view of an exemplary payload shroud. In this example, the payload shroud may include a diverter 20. The diverter 20 may act as a barrier wall preventing the water or debris from entering the body 12 of the UAV 10. The diverter 20 should fit flush with the payload opening 14 in the body 12 of the UAV 10. In this example, the payload opening 14 is circular in shape. As such, the diverter 20 has a circular cross-section. Of course, other shapes of the diverter 20 to comport with the shape of the payload opening 14 are possible. In this exemplary embodiment, the diverter 20 includes a cylindrical wall 22 extending into the body 12 of the UAV 10. The cylindrical wall 22 should generally have a height as tall as possible, while still being able to fit within the UAV body 12 and accommodate the payload 16. The diverter 20 may be made from any suitable rigid material or composite of materials as necessary to provide desired structure, withstand operating loads, etc.

As noted above, the shroud should be a tight fit in the UAV body 12 to minimize intrusion. Accordingly, there may be instances in which there is a need to accommodate geometric variations within the air vehicle design. For example, there may be harness size variations within the UAV body 12. To account for these variations, the diverter 20 may include flexible portions. In the disclosed embodiments, the flexible portions 24 a, b, c may include a flexible membrane covering a cut out of the diverter 20 material, of non-limiting shape/size with regard to necessary consideration. A cut out may be made in the cylindrical wall 22 at desired locations to accommodate for variances etc., with the particular payload 16 and the air vehicle. In the illustrated example, the diverter 20 includes four cut outs 24 a, b, c, d. Two cuts outs 24 a, b are arranged opposite each other on the diverter 20 are provided to accommodate the cable. A third cut out 24c is provided at a front of the diverter 20, to accommodate a material latch. A fourth cut out 24d is provided in a back portion of the diverter 20. The fourth cut out may be provided to accommodate a mechanical latch, such as a parachute latch. In some embodiments the parachute latch may need to be accessed manually.

The cuts outs may be covered. For example, a flexible membrane may seal the cut out and prevent water ingress. The flexible membrane may be provided over the entire diverter 20, over the exterior of the diverter 20, or over selected portions of the diverter 20. The flexible membrane should provide necessary elasticity to accommodate the particular design variations in the UAV 10 and payload 16. In this example, the mechanical latch must be manually accessed. Thus, the flexible membrane is not provided over the cut out 24d for the latch. The other cut-outs are sealed with the flexible membrane. In the example shown, the flexible membrane only covers the cut-outs 24 a, b, c.

As shown in FIG. 4, the payload 16 may extend beyond the top of the diverter 20. A seal may be provided at a top of a diverter 20. In order to accommodate the payload 16 size, the seal should be flexible, such as flexible member or a brush seal. A brush seal 28 is shown in the exemplary embodiment of FIG. 3. The brush seal 28 may be attached horizontally to the diverter 20. The brush seal 28 may act as a non-limiting barrier and prevent water, etc. from traveling further into the UAV body 12 and potentially over the top of the diverter 20. The brush seal 28 may include a base and bristles. The bristles may be flexible and extend from the base. In the example shown of a cylindrical diverter 20, the bristles of the brush are arranged on an interior of the cylinder and may be substantially perpendicular to the walls of the diverter 20. The brush seal 28 is preferably arranged at or near the top of the cylindrical wall 22. The brush seal 28 should be positioned in a vertical location along the diverter 20 to accommodate unimpeded operation of payload 16. The brush seal 28 may be removably attached to the diverter so the brush seal can be replaced independently of the entire payload shroud.

The flexibility of the brush seal 28 allows the payload 16 to extend beyond the top of the cylindrical wall 22 as well as to freely rotate. Additionally, the brush seal 28 and its flexibility can accommodate the payload 16 during the installation process. The brush seal may move independently to allow the payload to pass. That is, the payload moves the bristles out of the way as the payload is installed, without requiring manual intervention. This design allows for unchanged installation of example payload body 16 into the body 12 of the UAV 10. The flexibility of the brush seal 28 also allows the largest diameter of the payload 16 to pass through during the installation process. In addition, length of the brush bristles should be selected to accommodate unimpeded operation of payload 16 and desired clearance gap(s).

The shroud should be arranged within the UAV body 12 such that it does not interfere with the operation of the payload 16. Preferably the payload 16 should be suspended within the shroud in the center of the payload opening. The only contact between the shroud and the payload 16 may be via the brush seal 28. In an exemplary embodiment, brackets 21 may be provided at a base of the diverter 20. These brackets may be used to attach the shroud to the body 12 of the UAV 10. FIG. 4 shows an example of a payload and mounting apparatus. In this example four posts 23 are provided as part of a mounting apparatus on the body 12 of the UAV 10. Accordingly, four brackets positioned appropriately may be provided at the bottom of the payload shroud. The post are placed over brackets to install the payload shroud.

The payload 16 may then be installed within the body 12 of the UAV 10. Isolators and spacers may be provided. The payload 16 may include a mounting plate for attachment via the four posts to the body 12 of the UAV 10. Other mechanisms for mounting the payload and payload shroud are also possible depending on the particular UAV and payload design.

The shroud allows for air to travel into the body 12 of the UAV 10. This may be important for the static sensor readings on some air vehicles. If an air tight seal via a gasket is used, static air sensors, such as sensor for air pressure, air speed, etc., may lose their accuracy and impact the operation of the UAV 10. Additionally, providing an air path to the interior of the UAV 10 minimizes an risk of the avionics may over heat. An air path may be maintained via sizing non-critical gaps between diverter 20, payload 16, and body 12.

It will be understood that the above description of the present invention is susceptible to various modifications, changes and adaptations, and that the same are intended to be comprehended within the meaning and range of equivalents of the appended claims.

What is claimed is:

1. A payload shroud, comprising:
   a diverter including a cylindrical wall defining a hollow central portion, wherein the cylindrical wall defines a cutout and an access port via which a mechanical latch is accessible;
   a seal;
   a flexible membrane disposed over the cutout;
   a bracket provided at a base of the diverter;
   wherein the access port extends through a top of the cylindrical wall; and
   wherein the seal is discontinuous at the access port.

2. The payload shroud of claim 1, wherein the seal is a brush seal.

3. The payload shroud of claim 2, wherein the brush seal comprises a base having a circular shape and bristles, the bristles being flexible.

4. The payload shroud of claim 1, wherein the brush seal is disposed at an end of the diverter.

5. The payload shroud of claim 3, wherein the brush seal is attached in a horizontal position such that the bristles are substantially perpendicular to the cylindrical wall of the diverter.

6. The payload shroud of claim 3, wherein the bristles extend toward an interior defined by the hollow central portion.

7. The payload shroud of claim 1, wherein the diverter has a height to accommodate platform geometry limitations.

8. The payload shroud of claim 1, wherein the cylindrical wall defines at least one cutout, the cutout being sized and positioned in the cylindrical wall to accommodate variations in payload.

9. The payload shroud of claim 8, wherein the cylindrical wall defines three cutouts.

10. The payload shroud of claim 9, wherein the flexible membrane is disposed over the three cutouts.

11. The payload shroud of claim 10, wherein the flexible membrane seals the cutouts.

12. A body for an air vehicle, including a payload receiving portion, the payload receiving portion being adapted to receive a payload via an opening; a diverter disposed within the opening, the diverter including a cylindrical wall defining a central portion and having a cutout, a bracket, and an access port via which a parachute latch is accessible, the cylindrical wall having a top and a bottom; a seal disposed at one or both of the top or bottom of the cylindrical wall; a flexible membrane disposed over the cutout; and wherein the access port extends through the top of the cylindrical wall.

13. The body for an air vehicle of claim 12, wherein the seal is a brush seal.

14. The body for an air vehicle of claim 13, wherein the brush seal comprises a base having a circular shape and bristles, the bristles being flexible.

15. The body for an air vehicle of claim 12, wherein the brush seal is disposed at an end of the diverter.

16. The body for an air vehicle of claim 14, wherein the brush seal is attached in a horizontal position such that the bristles are substantially perpendicular the cylindrical wall of the diverter.

17. The body for an air vehicle of claim 14, wherein the bristles extend toward an interior defined by the central portion.

18. The body for an air vehicle of claim 12, wherein the diverter has a height to accommodate platform geometry limitations.

19. The body for an air vehicle of claim 12, wherein the cylindrical wall defines at least one cutout, the cutout being sized and positioned in the wall to accommodate variations in payload.

20. The body for an air vehicle of claim 19, wherein the cylindrical wall defines three cutouts.

21. The body for an air vehicle of claim 20, further comprising a flexible membrane disposed over the cutouts.

22. The body for an air vehicle of claim 21, wherein the flexible membrane seals the cutout.

23. An air vehicle, comprising:
a body defining a payload opening, the body including a mounting apparatus comprising at least one post;
a payload suspended in the payload opening;
a payload shroud arranged within the body and around the payload, the payload shroud including a diverter, a seal, a flexible membrane, and at least one bracket,
wherein the diverter is attached to the body above the opening by placing the posts over the at least one bracket,
wherein the diverter includes a cylindrical wall defining a central portion, a cutout, and an access port, the cylindrical wall having a top and a bottom,
wherein the seal is disposed at the top of the cylindrical wall,
wherein the flexible membrane is disposed over the cutout, and
wherein the access port extends through a top of the cylindrical wall.

* * * * *